(12) United States Patent (10) Patent No.: US 9,094,180 B2
Zirwas et al. (45) Date of Patent: Jul. 28, 2015

(54) CHANNEL-ADAPTIVE TRANSMISSION IN A DISTRIBUTED COORDINATED MULTI-POINT TRANSMISSION SYSTEM

(75) Inventors: Wolfgang Zirwas, München (DE); Lars Thiele, Berlin (DE); Thomas Wirth, Berlin (DE); Thomas Haustein, Potsdam (DE); Malte Schellmann, Munich (DE); Volker Jungnickel, Berlin (DE)

(73) Assignee: Nokia Siemens Networks Oy, Espoo (FI)

(*) Notice: Subject to any disclaimer, the term of this patent is extended or adjusted under 35 U.S.C. 154(b) by 368 days.

(21) Appl. No.: 13/391,769

(22) PCT Filed: Aug. 24, 2009

(86) PCT No.: PCT/EP2009/060855
§ 371 (c)(1),
(2), (4) Date: Mar. 5, 2012

(87) PCT Pub. No.: WO2011/023216
PCT Pub. Date: Mar. 3, 2011

(65) Prior Publication Data
US 2012/0207092 A1 Aug. 16, 2012

(51) Int. Cl.
*H04W 4/00* (2009.01)
*H04L 5/00* (2006.01)
*H04L 25/03* (2006.01)

(52) U.S. Cl.
CPC ............ *H04L 5/0091* (2013.01); *H04L 5/0073* (2013.01); *H04L 25/03343* (2013.01); *H04L 2025/03414* (2013.01); *H04L 2025/03815* (2013.01)

(58) Field of Classification Search
CPC ............ H04L 5/00; H04L 5/0073; H04L 2025/03414; H04L 5/0091; H04L 25/03343; H04L 2025/03815
See application file for complete search history.

(56) References Cited

U.S. PATENT DOCUMENTS

| | | | |
|---|---|---|---|
| 2002/0022482 A1* | 2/2002 | Ishikawa | 455/434 |
| 2008/0014946 A1* | 1/2008 | Kubota | 455/436 |
| 2010/0111037 A1* | 5/2010 | Tanigawa et al. | 370/331 |
| 2011/0026484 A1* | 2/2011 | Fox et al. | 370/331 |

FOREIGN PATENT DOCUMENTS

EP 1 443 710 A2 8/2004

OTHER PUBLICATIONS

3GPP TR 36.814 V1.3.0 (Jun. 2009), "3rd Generation Partnership Project; Technical Specification Group Radio Access Network; Further Advancements for E-UTRA Physical Layer Aspects (Release 9)", 46 pgs.

(Continued)

*Primary Examiner* — Anez Ebrahim
(74) *Attorney, Agent, or Firm* — Harrington & Smith

(57) ABSTRACT

A user equipment obtains channel state information for base stations serving the user equipment according to a coordinated multi-point transmission, arranges the channel state information in a predetermined order, and transmits the channel state information in the predetermined order. At least one base station of the base stations receives the channel state information, arranges the channel state information in the predetermined order into a datagram, and transmits the datagram to at least one other base station of the base stations.

27 Claims, 5 Drawing Sheets

(56) References Cited

OTHER PUBLICATIONS

3GPP TS36.424 V8.4.0 (Dec. 2008), "3rd Generation Partnership Project; Technical Specification Group Radio Access network; Evolved Universal Terrestrial Access network (E-UTRAN); X2 data transport (Release 8)", 8 pgs.

R1-091712, TSG-RAN WG1 #57, San Francisco, CA May 4-8, 2009, "Preliminary Performance Study on CoMP Schemes", ZTE, 8 pgs.

R1-092221, TSG-RAN WG1 #57, San Francisco, USA, May 4-8, 2009, "Spatial Correlation Feedback to Support LTE-A MU-MIMO and CoMP; system Operation and Performance Results", Motorola, 11 pgs.

* cited by examiner

CHANNEL-ADAPTIVE TRANSMISSION IN A DISTRIBUTED COORDINATED MULTI-POINT TRANSMISSION SYSTEM

The present invention relates to Coordinated Multi-Point transmission (CoMP) in a communication system. In particular, the present invention relates to channel-adaptive transmission in a distributed coordinated multi-point transmission system.

Multiple antenna systems have been shown to allow an active exploitation of the spatial degrees of freedom in order to increase the spectral efficiency and boost throughput in wireless communication systems. In particular, spatial separation of simultaneously transmitted data streams can be performed either at a transmitter or a receiver depending on available channel state information (CSI) and possibilities of joint signal processing.

Currently for 3G-LTE (Third Generation-Long Term Evolution)-Advanced so called Coordinated Multi-Point (CoMP) transmission is investigated in an effort to overcome inter cell interference limitations. High performance gains can be expected from so called joint precoding solutions, where pre-coded data are transmitted from several eNBs (evolved Node Bs) simultaneously to several UEs (User Equipments).

Highest performance would be achieved in case of a full network wide cooperation, but this would require channel estimation from all eNBs to all UEs, feedback of this huge amount of information from the UEs to the eNBs as well as multicasting of user data from all UEs to all eNBs.

In practical systems therefore so called cooperation areas (CA) have to be defined limiting cooperation to a few adjacent cells.

Optionally it may be possible to use CoMP transmission steered by a central unit (CU). However, a CU-driven CoMP is not flexible in usage because collaboration areas (CA) are fixed, and is not scalable for typically large mobile communication networks. Moreover, large delays may have to be accepted by the central approach, which also requires high processing power at the central unit (CU).

The present invention aims at allowing channel-adaptive and coherent signal transmission from several base stations for active interference management in a cellular collaboration area.

According to an embodiment of the invention, for distributed CoMP transmission coherent channel state information (CSI) knowledge can be provided for collaborating base stations such as eNBs. Protocols are described which support unique identifiers for distributed processing, in order to support the ability to determine precoder weights which are distributed to each individual precoder of a base station belonging to a collaboration area (CA). This ensures the same signal processing as a central unit would do.

Access is supported for different types of UEs, i.e. Release 8 UEs may be supported jointly with more advanced UEs. Furthermore, mobile users and stationary UEs are supported.

Malfunctions in the distributed processing can be identified at an early stage and it is possible to correct errors in the processing by defined protocols following pre-agreed rules on how to handle errors.

According to an embodiment of the invention, a user equipment obtains channel state information for base stations serving the user equipment according to a coordinated multi-point transmission, arranges the channel state information in a predetermined order, and transmits the channel state information in the predetermined order. At least one base station of the base stations receives the channel state information, arranges the channel state information in the predetermined order into a datagram, and transmits the datagram to at least one other base station of the base stations.

In the following, embodiments of the invention are described with reference to the accompanying drawings, in which.

Figure 1:
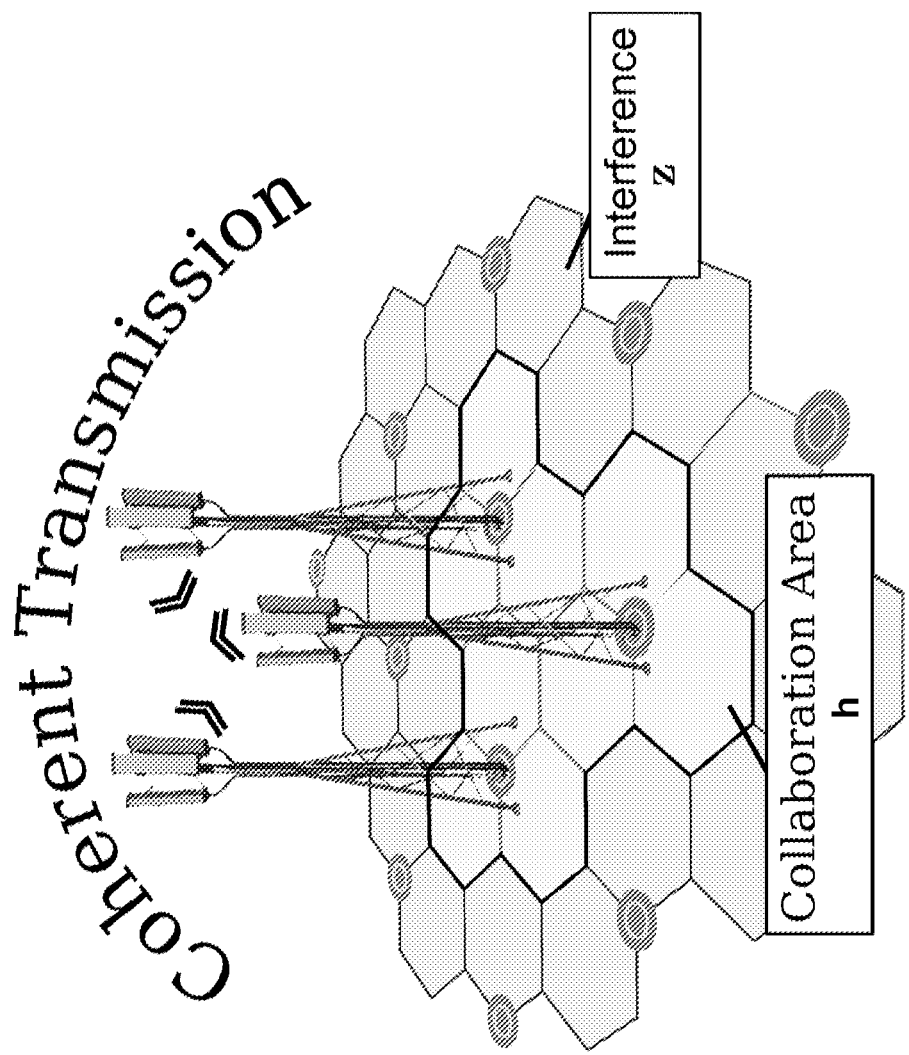
FIG. 1 shows a diagram illustrating coherent transmission in a collaboration area.

The present invention focuses on active interference management of collaborative base stations (BSs) signal processing in the cellular downlink, also known as Coordinated Multi-Point transmission (CoMP), as shown in FIG. 1. FIG. 1 illustrates coherent transmission in a collaborating area (CA) with channel function h, which is surrounded by areas causing interference z. A cellular deployment with a decentralized signal processing architecture as e.g. proposed for 3G-LTE-Advanced is considered.

Figure 2:
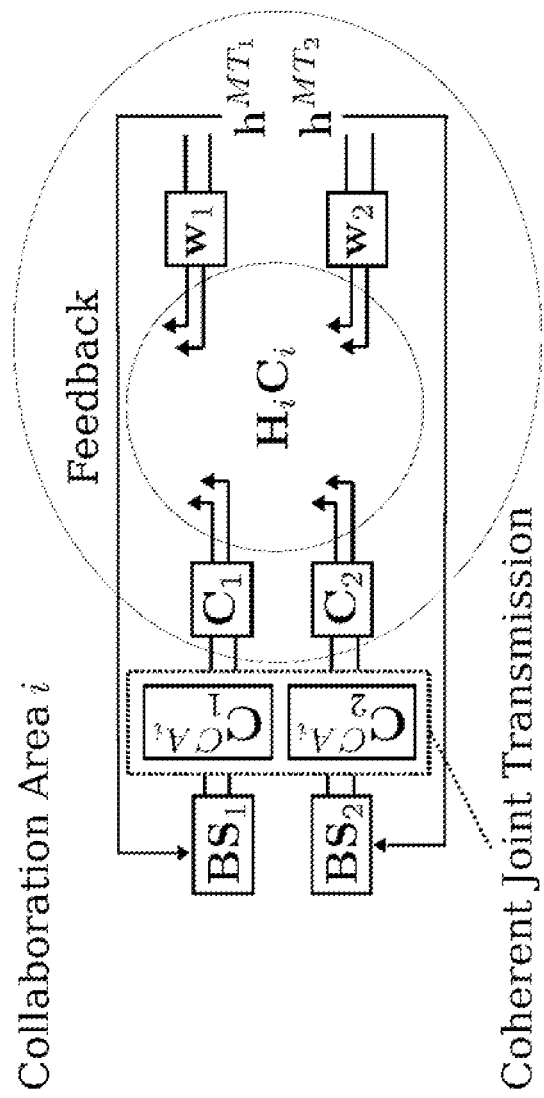
FIG. 2 shows a schematic diagram illustrating a concept of distributed CoMP transmission using individual precoders.

Referring to FIG. 2, each base station $BS_1$, $BS_2$ has an individual precoder $C^{CA}$, where precoder weights are determined independently at each collaborating base station. As shown in FIG. 2, the base stations $BS_1$ and $BS_2$ perform coherent joint transmission in a collaboration area i and receive feedback from UEs (not shown) in the collaboration area i. The UEs apply whitening filters $w_i$ to signals received from the base stations and provide feedback based on the received signals to the base stations. In FIG. 2 H is the channel matrix and T represents precoder weights.

In order to enable a distributed CoMP transmission, it has to be ensured that each base station of a collaboration area performs exactly the same precoding so that resulting Tx (transmitter) signals per base station are exactly the same. To be precise, based on the same available user data exactly the same precoding is calculated at each base station. For this purpose it has to be ensured that all base stations have access to data streams of all cooperating UEs.

This can be achieved by a unicast transmission of CSI data from a specific UE to its serving (dedicated) base station. Collaborating base stations then exchange the CSI-feedback reported by their UEs. And therefore, a backhaul link with low delays is required.

Alternatively or in addition, multicasting of CSI over the air from all UEs to all base stations is adopted, i.e. an improved UL (uplink) feedback link is required.

In real systems it may be beneficial to find a trade-off between both possibilities of sharing user-specific CSI feedback or to use both solutions jointly to have a fall-back solution for the case of occurring errors. According to an embodiment of the invention, distributed CoMP systems operate by using suitable protocols, which follow predefined rules in case of malfunctions. In order to ensure coherent CSI knowledge especially when exchanging the feedback information over X2 interface between base stations, according to an embodiment of the invention a feedback message contains identifiers, e.g. time stamps, which indicate their validity and life time. In case of lost/damaged CSI data it can be beneficial to drop the complete broken information and reuse old CSI. If applicable, i.e. only one data stream between a single base station and its UE is currently affected by errors, other base stations within the CA may send the specific feedback data. In particular, this is applicable when CSI multicasting over the air is performed.

In order to have coherent channel state information available at collaborating base stations, it has to be ensured that all UEs are reporting their CSI in unified way. It is mandatory that compound channel matrices put together at different base stations are identical in each entry. This has to be assured per sub-carrier or per physical resource block (PRB) in OFDM (Orthogonal Frequency Division Multiplexing) systems where transmit collaboration is applied. According to an embodiment of the invention, a pre-agreed order is realized by numbering all active base station Tx antennas within the CA, while keeping track of a corresponding user equipment (UE) identifier. This antenna numbering has to be known to all UEs. According to an embodiment of the invention, this is arranged by defining a rule, which can be figured out by all UEs, e.g. by using cell identifications of the base stations of the collaboration area in an ascending order.

For example, it is assumed that each base station has two Tx antennas, and four base stations are doing CoMP. Then CSI data transmitted from a user equipment in the collaboration area is in the form:

$[[Tx1Tx2]_{cell\_id1} \quad [Tx1Tx2]_{cell\_id3} \quad [Tx1Tx2]_{cell\_id4} \quad [Tx1Tx2]_{cell\_id2}]]$ where cell_id1<cell_id3<cell_id4<cell_id2.

Wireless communication systems may have a mixture of different types of UEs, which have to be supported. The UEs may be subdivided into two main groups. The first main group comprises old (Release 8) UEs, which are not capable of providing CSI data, or users which are moving too fast, where the CSI data will be outdated when it may be applied at the different base stations of a collaboration area, i.e. delay sensitive users. The second group comprises stationary UEs, well-suited for CSI feedback with high demands on the achievable throughput.

In order to support both groups, base stations have to arrange their transmission using some type of static (fixed codebook-based) precoding and channel-aware (CSI-aware) pre-coding. In cellular systems according to an embodiment of the invention base stations are allowed to switch between operation modes. This switching may be arranged over time domain, i.e. in a TDMA-(Time Division Multiple Access-) like mode, or over frequency, i.e. using specific subbands for CoMP (CSI-aware) and other parts for static precoding. This switching may be deployed in a traditional "frequency reuse" (or time-access) fashion, such that a collaboration area (CA) doing CoMP is surrounded by cells doing static precoding. This may also help the UEs inside the CA to estimate the surrounding interference using common reference signals and applying static codebook entries. Thus, surrounding interference is kept predictable. In other resources (time or frequency) the base stations belonging to this CA are forced to use static codebook entries for spatial precoding supporting their "old" or mobile UEs.

According to an embodiment of the invention, protocols to identify and correct malfunctions in distributed processing are provided. These protocols ensure distributed spatial precoding to be successfully performed and help to keep data consistency at all distributed points.

In case correctly received CSI at all collaborating base stations from all UEs in the collaboration area is not ensured, the base stations belonging to the collaboration area may exchange their CSI knowledge corresponding to UEs which require to be served by CoMP.

In case a single (or multiple) base station(s) has (have) incomplete CSI data or is (are) not capable of determining the precoder weights for any other reason, other base stations of the collaboration area may send the corresponding precoder weights over the X2 interface between the base stations.

If partial CSI, i.e. from a specific user equipment, is unavailable, according to an embodiment of the invention CSI data from "older" frames are reused. This will lead to a decreased throughput for this user equipment, but maintains the CoMP operating. The other UEs of the collaboration area are not affected.

If the inversion channel matrix, e.g. for the zero-forcing solution, is hardly possible, e.g. due to rank reduction, it may be beneficial to switch off at least one data stream. For this purpose, according to an embodiment of the invention the collaborating base stations communicate over the X2 interface. The rule which data stream has to be switched off may be pre-agreed or is individually determinable by each of the distributed base stations.

According to an embodiment of the invention, to keep CSI consistency, identifiers are used which indicate a frame number (subframe number), life time (time stamp) and ordering of Tx antennas.

Data- and CSI-exchange, precoder calculation and scheduler decisions have to be synchronized. Moreover, time- and frequency-reuse access for CoMP and non-CoMP transmission has to be arranged/agreed by a protocol, i.e. at which resources (time/frequency) each base station has to use a specific pre-coder mode.

Figure 3:
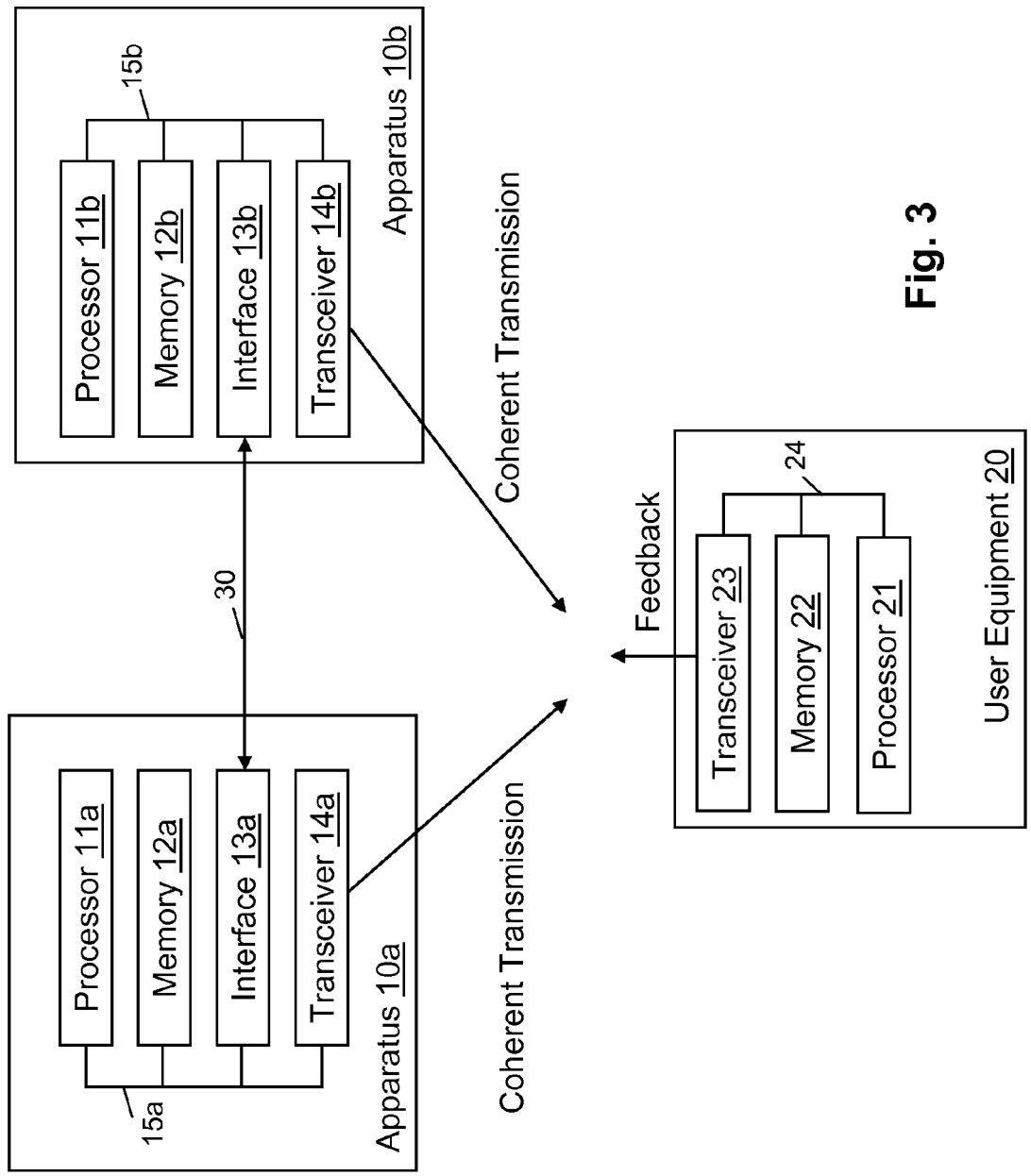
FIG. 3 shows a schematic block diagram illustrating a structure of base stations and a user equipment according to an embodiment of the invention.

Referring to FIG. 3, apparatuses 10a, 10b and a user equipment 20 according to an embodiment of the invention are shown. The apparatuses 10a, 10b may comprise base stations such as eNBs. The apparatuses 10a, 10b are considered to serve jointly processed data streams of a CoMP transmission. In other words, the apparatuses 10a, 10b are collaborating base stations in a collaboration area of a CoMP system. The user equipment 20 is considered to be served by the apparatuses 10a, 10b.

As shown in FIG. 3, the apparatus 10a comprises a processor 11a, a memory 12a, an interface 13a and a transceiver 14a, which are linked by a bus 15a. The transceiver 14a is coupled to one or more antennas (not shown) for bidirectional wireless communications over one or more wireless links with the user equipment 20. The apparatus 10b comprises a processor 11b, a memory 12b, an interface 13b and a transceiver 14b, which are linked by a bus 15b. The transceiver 14b is coupled to one or more antennas (not shown) for bidirectional wireless communications over one or more wireless links with the user equipment 20.

The user equipment 20 comprises a processor 21, a memory 22 and a transceiver 23, which are linked by a bus 24. The transceiver 23 is coupled to one or more antennas (not shown) for bidirectional wireless communications over one or more wireless links with the apparatuses 10a, 10b.

Inherent in the processors 11a, 11b and 21 is a clock to enable synchronism among the various apparatus for transmissions and receptions within the appropriate time intervals and slots required, as the scheduling grants and the granted resources/subframes are time dependent. The transceivers 14a, 14b, 23 include both transmitter and receiver, and inherent in each is a modulator/demodulator commonly known as a modem. The interfaces 13a, 13b also are assumed to each include a modem to facilitate communication over a (hardwire) link 30 between apparatus 10a and apparatus 10b.

The exemplary embodiments of this invention may be implemented by computer software stored in the memories 12a, 12b, 22 and executable by the corresponding processor, or by hardware, or by a combination of software and/or firmware and hardware in any or all of the apparatuses and user equipment shown in FIG. 3.

In general, the various embodiments of the user equipment 20 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The memories 12a, 12b, 22 may be of any type suitable to the local technical environment and may be implemented using any suitable data storage technology, such as semiconductor-based memory devices, magnetic memory devices and systems, optical memory devices and systems, fixed memory and removable memory. The processors 11a, 11b, 21 may be of any type suitable to the local technical environment, and may include one or more of general purpose computers, special purpose computers, microprocessors, digital signal processors (DSPs) and processors based on a multi-core processor architecture, as non-limiting examples.

The apparatuses 10a, 10b and the user equipment 20 belong to a collaboration area of a CoMP system. The apparatuses 10a, 10b provide coherent transmission to the user equipment 20, and the user equipment 20 provides feedback to at least one of the apparatuses 10a, 10b. This feedback may comprise channel state information which is obtained, e.g. determined, by the processor 21 for the apparatuses 10a, 10b. The channel state information may be obtained for each transmitter antenna Tx of the transceivers 14a, 14b, i.e. for each channel on which signals are received from the apparatuses 10a, 10b. The processor 21 arranges the channel state information in a predetermined order, and the transceiver 23 transmits the channel state information in the predetermined order.

As mentioned above, according to an embodiment of the invention, the user equipment 20 multicasts the channel state information to the apparatuses 10a, 10b. According to another embodiment of the invention, the user equipment 20 unicasts the channel state information to its dedicated base station, i.e. apparatus 10a or apparatus 10b.

According to a cellular communication system in which the present invention may be employed, each apparatus 10a, 10b has a cell identification. According to an embodiment of the invention, the processor 21 arranges the channel state information in the form $[[TX_1 \ldots TX_{m]cell\_}{}^{id1} \ldots [Tx_1 \ldots Tx_n]_{cell\_}{}^{idk}]$ with cell_id1 < ... < cell_idk, wherein $[Tx_m]_{cell\_}{}^{idk}$ represents channel state information for transmitter antenna m of apparatus 10a, 10b with cell_idk, $[Tx_n]_{cell\_}{}^{idk}$ represents channel state information for transmitter antenna n of apparatus 10a, 10b with cell_idk, k being an integer equal to or greater than 2, and m and n being integers equal to or greater than 1, wherein the processor 21 arranges the channel state information for the apparatuses 10a, 10b in an ascending order of the cell identifications.

In the arrangement shown in FIG. 3, assuming that apparatus 10a has cell_id1, apparatus 10b has cell_id2, cell_id1 < cell_id2, and each apparatus 10a, 10b has two Tx antennas, the user equipment 20 arranges the channel state information in the form $[[Tx1 \ Tx2]_{cell\_}{}^{id1} [Tx1 \ Tx2]_{cell\_}{}^{id2}]$, wherein the order of the channel state information for the respective antennas (i.e. the antenna numbering) is known by the user equipment 20.

For example, in case apparatus 10a is the dedicated base station of the user equipment 20 and unicasting of CSI data is performed, the user equipment 20 transmits the channel state information in the predetermined order to the apparatus 10a. The processor 11a obtains the channel state information and arranges the channel state information in the predetermined order into a datagram. The processor 11a may determine a life time of the channel state information, and may arrange a time stamp indicating the life time of the channel state information into the datagram. The processor may further arrange an identifier into the datagram, which identifies a signal transmission on at least one of the jointly processed data streams. The interface 13a transmits the datagram to the apparatus 10b over the link 30 which may be an X2 interface. The interface 13b receives the datagram. The interfaces 13a, 13b may exchange the datagram using user datagram protocol and internet protocol.

Figure 4:
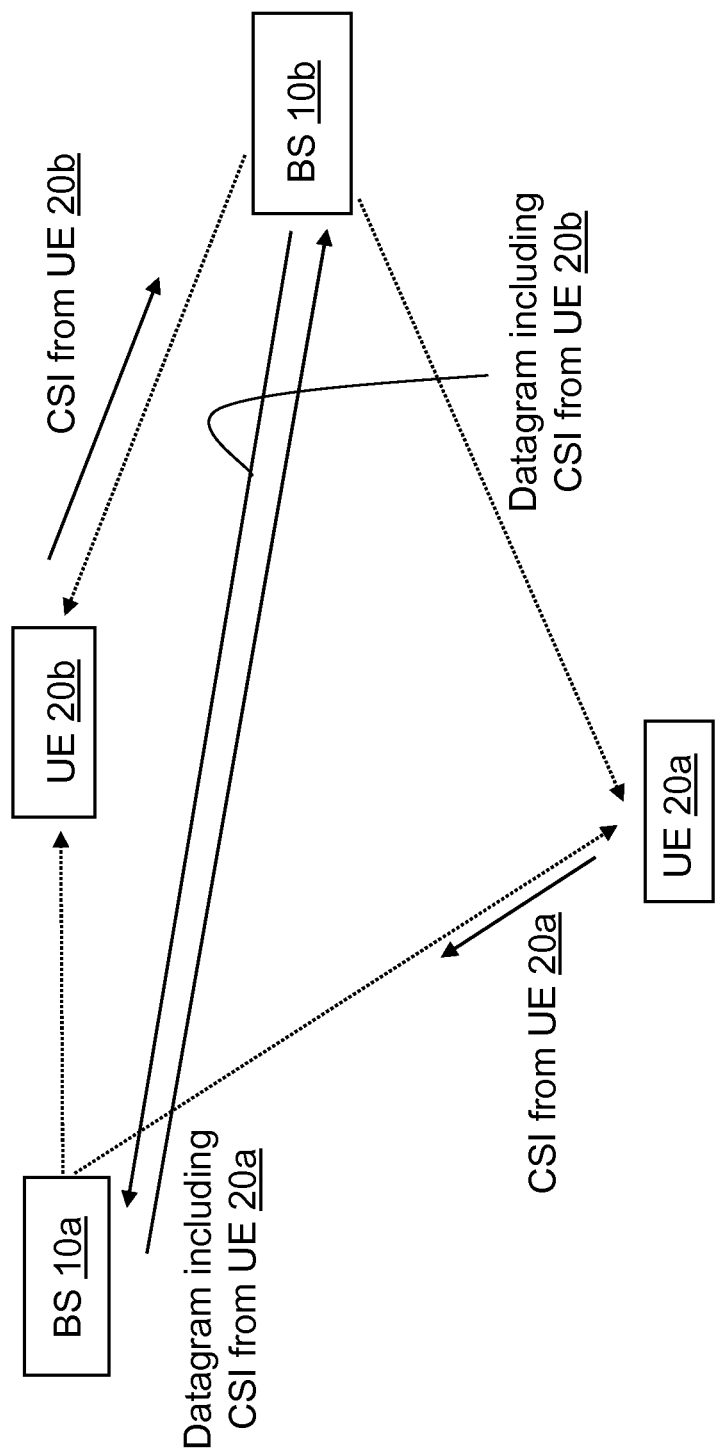
FIG. 4 shows a diagram illustrating CSI data transmission and exchange in a distributed CoMP system according to an embodiment of the invention.

The arrangement shown in FIG. 4 comprises two base stations BS 10a, BS 10b and two user equipments UE 20a and UE 20b in a collaboration area of a CoMP system. The structure of BS 10a and BS 10b may correspond to that of apparatus 10a and apparatus 10b, respectively. The structures of UE 20a and UE 20b may correspond to that of the user equipment 20. Jointly processed data streams between BS 10a, BS 10b and UE 20a, UE 20b are shown as broken lines.

In case unicasting of CSI data is performed, UE 20a sends channel state information in the predetermined order as described above to its dedicated base station which in the arrangement of FIG. 4 is the BS 10a, and the UE 20b sends channel state information to its dedicated base station BS 10b. At BS 10a, the channel state information in the predetermined order received from the UE 20a is arranged in a datagram together with an identifier and a time stamp as described above, and the datagram is sent to the BS 10b e.g. via the X2 interface. Similarly, at the BS 10b the channel state information in the predetermined order received from the UE 20b is arranged in a datagram together with an identifier and a time stamp as described above, and the datagram is sent to the BS 10a e.g. via the X2 interface. Thus, complete CSI data are available at each base station BS 10a, BS 10b, and it can be ensured that compound channel matrices put together at the BS 10a and the BS 10b are identical in each entry.

Figure 5A:
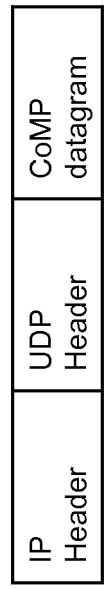
FIG. 5A shows a structure of a CoMP message including a CoMP datagram according to an embodiment of the invention.
Figure 5B:
FIG. 5B shows a structure of the CoMP datagram according to an embodiment of the invention.

FIGS. 5A and 5B illustrate an implementation of a CoMP protocol used for exchanging CSI data between collaborating base stations according to an embodiment of the invention.

As shown in FIG. 5A, base stations use CoMP datagrams which are sent via UDP/IP (User Datagram Protocol/Internet Protocol) to exchange CSI data. IP is scalable, is a widely used protocol, and supports fragmentation, so CoMP datagrams can be of arbitrary size.

Moreover, protocol stacks for UDP/IP are already implemented in many network devices, and IP adds only small overhead to CSI data. UDP/IP does not depend on the transport technology used and can be transmitted over e.g. 3G-LTE, fiber optics, DSL (Digital Subscriber Line), air-LASER links, etc. or any combination thereof.

The CoMP datagram shown in FIG. 5B includes a frame number/unique identifier, a timestamp and the channel state information as described above, wherein it is assumed that cell_id1 < cell_id3 < cell_id4 < cell_id2.

The base stations BS 10a, BS 10b shown in FIG. 4 or apparatuses 10a, 10b shown in FIG. 3 determine signal transmission on at least one of the jointly processed data streams, i.e. data streams between base stations and user equipments in a collaboration area, shown as broken lines in FIG. 4) based on the channel state information included in the datagram, wherein the signal transmission is identified by the identifier of the datagram. In other words, the identifier identifies which predefined set of UEs will be cooperating on which resources. For example, the above-described unique identifier identifies a CA and the frame number identifies the signal transmission in the CA.

Usage of the channel state information included in the datagram for the signal transmission may be determined based on the time stamp included in the datagram. In case the time stamp indicates that the life time of the channel state information has expired, old channel state information used in a previous signal transmission may be used for the signal transmission. In case there is no channel state information available for the signal transmission, precoder weights may be used for the signal transmission, which may be exchanged between the apparatuses 10a, 10b by the interfaces 13a, 13b over the link 30. The apparatuses 10a, 10b may also exchange information by the interfaces 13a, 13b over the link 30 which may be used for deciding to switch off at least one of the jointly processed data streams between the apparatuses 10a, 10b and the at least one user equipment 20.

It is to be noted that each apparatus 10a, 10b may calculate a precoder matrix including precoder weights for each base station serving the jointly processed data streams, and user equipments are aware of channels (data streams) on which they are served.

The apparatuses 10a, 10b may operate in a first operation mode in which the signal transmission is determined based on the channel state information, and a second operation mode in which static precoding is used for the signal transmission.

According to an embodiment of the invention, an apparatus comprises obtaining means for obtaining channel state information for jointly processed data streams of a coordinated multi-point transmission, the channel state information being in a predetermined order, arranging means for arranging the channel state information in the predetermined order into a datagram, and transmitting means for transmitting the datagram to at least one base station of a plurality of base stations which serve the jointly processed data streams. The apparatus may further comprise first determining means for determining a life time of the channel state information, and the arranging means may be for arranging a time stamp indicating the life time of the channel state information into the datagram. The arranging means may further be for arranging an identifier into the datagram which indicates a signal transmission on at least one of the jointly processed data steams. The apparatus may be one of the plurality of base stations.

The apparatus may comprise apparatus 10a, 10b (or base station BS 10a, BS 10b), the obtaining means, first determining means and arranging means may comprise processor 11a, 11b, and the transmitting means may comprise interface 13a, 13b.

The apparatus may further comprise first receiving means for receiving the channel state information in the predetermined order from at least one user equipment of user equipments served by the jointly processed data streams. The first receiving means may comprise transceiver 14a, 14b.

The apparatus may comprise second receiving means for receiving a datagram including channel state information in the predetermined order from at least one base station of the plurality of base stations which serve the jointly processed data streams. The second receiving means may also be for receiving a datagram including channel state information and a timestamp indicating a life time of the channel state information. The second receiving means may further be for receiving a datagram including channel state information, a time-stamp indicating a life time of the channel state information and an identifier identifying a signal transmission on at least one of the jointly processed links. The second receiving means may comprise interface 13a, 13b.

The apparatus may comprise second determining means for determining signal transmission on at least one of the jointly processed data streams based on the channel state information included in the datagram, wherein the signal transmission may be identified by the identifier of the datagram. The second determining means may comprise processor 11a, 11b.

The apparatus may comprise deciding means for deciding whether to use the channel state information included in the datagram for the signal transmission, based on the time stamp included in the datagram. The deciding means may comprise processor 11a, 11b.

The deciding means may be for deciding to use old channel state information used in a previous signal transmission for the signal transmission, in case the time stamp indicates that the life time of the channel state information has expired.

The apparatus may comprise communicating means for communicating precoder weights between the apparatus and at least one base station of the plurality of base stations which serve the jointly processed data streams, and the deciding means may be for deciding to use the precoder weights for the signal transmission in case there is no channel state information available for said signal transmission. The communicating means may comprise interface 13a, 13b.

The communicating means may be for communicating information between the apparatus and at least one base station of the plurality of base stations which serve the jointly processed data streams, and the apparatus may further comprise switching means for switching off at least one of the jointly processed data streams between the apparatus and the at least one user equipment served by the jointly processed data streams based on the information. The switching means may comprise processor 11a, 11b.

The apparatus may comprise operating means for operating the apparatus in a first operation mode in which the signal transmission is determined based on the channel state information, and a second operation mode in which static precoding is used for the signal transmission. The operating means may comprise processor 11a, 11b.

The transmitting means and the second receiving means may be for transmitting/receiving the datagram using user datagram protocol and internet protocol.

Each of the plurality of base stations may have a cell identification, wherein the channel state information from a user equipment of a plurality of user equipments served by the jointly processed data streams is obtained in the form $[[TX_1 \ldots TX_m]_{cell\_}^{id1} \ldots [TX_1 \ldots TX_n]_{cell\_}^{idk}]$ with cell_id1< . . . <cell_idk, wherein $[Tx_m]_{cell\_}^{idk}$ represents channel state information for transmitter antenna m of base station with cell_idk, $[Tx_n]_{cell\_}^{idk}$ represents channel state information for transmitter antenna n of base station with cell_idk, k being an integer equal to or greater than 2, and m and n being integers equal to or greater than 1, wherein the channel state information for the plurality of base stations serving the user equipment are arranged in an ascending order of the cell identifications.

According to an embodiment of the invention, a user equipment comprises obtaining means for obtaining channel state information for base stations serving the user equipment according to a coordinated multi-point transmission, and arranging means for arranging the channel state information in a predetermined order, and transmitting means for transmitting the channel state information in the predetermined order.

The user equipment may comprise user equipment 20 (or UE 20a, 20b), the obtaining means may comprise processor 21 and the transmitting means may comprise transceiver 23.

The arranging means may be for arranging the channel state information in the form $$[[Tx_1 \ldots Tx_m]_{cell\_}{}^{id1} \ldots [TX_1 \ldots TX_n]_{cell\_}{}^{idk}]$$ with cell_id1<<cell_idk, wherein $[Tx_m]_{cell\_}{}^{idk}$ represents channel state information for transmitter antenna m of base station with cell_idk, $[Tx_n]_{cell\_}{}^{idk}$ represents channel state information for transmitter antenna n of base station with cell_idk, k being an integer equal to or greater than 2, and m and n being integers equal to or greater than 1, wherein the processor is configured to arrange the channel state information for the base stations serving the user equipment in an ascending order of cell identifications of the base stations.

The various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising: at least a one processor and at least one memory including computer program code,
   wherein the at least one memory and the computer code are configured to, with the at least one processor, cause the apparatus to at least perform the following:
   obtain channel state information for jointly processed data streams of a coordinated multi-point transmission, the channel state information being in a predetermined order, and
   arrange the channel state information in the predetermined order into a datagram;
   determine a life time of the channel state information, and arrange a time stamp indicating the life time of the channel state information into the datagram; and
   an interface configured to transmit the datagram to at least one base station of at least two base stations which serve the jointly processed data streams of a coordinated multi-point transmission;
   wherein said coordinated multi-point transmission of jointly processed data streams comprises joint precoding of data and simultaneous transmission of the precoded data from the at least two base stations.

2. The apparatus of claim 1, wherein the at least one memory and the computer code are further configured to, with the at least one processor, cause the apparatus to at least perform the following: an identifier identifying a signal transmission on at least one of the jointly processed data streams into the datagram.

3. The apparatus of claim 2, wherein the at least one memory and the computer code are further configured to, with the at least one processor, cause the apparatus to at least perform the following: determine signal transmission on at least one of the jointly processed data streams based on the channel state information included in the datagram.

4. The apparatus of claim 3, wherein the at least one memory and the computer code are further configured to, with the at least one processor, cause the apparatus to at least perform the following: decide whether to use the channel state information included in the datagram for the signal transmission, based on the time stamp included in the datagram.

5. The apparatus of claim 4, wherein the at least one memory and the computer code are further configured to, with the at least one processor, cause the apparatus to at least perform the following: use old channel state information used in a previous signal transmission for the signal transmission, in case the time stamp indicates that the life time of the channel state information has expired.

6. The apparatus of claim 3, wherein the interface is further configured to communicate precoder weights between the apparatus and at least one base station of the at least two base stations which serve the jointly processed data streams, and the processor is configured to use the precoder weights for the signal transmission in case there is no channel state information available for said signal transmission.

7. The apparatus of claim 3, wherein the at least one memory and the computer code are further configured to, with the at least one processor, cause the apparatus to at least perform the following: operate in a first operation mode in which it determines the signal transmission based on the channel state information, and a second operation mode in which it uses static precoding for the signal transmission.

8. The apparatus of claim 1, further comprising a transceiver configured to receive the channel state information in the predetermined order from at least one user equipment of user equipments served by the jointly processed data streams.

9. The apparatus of claim 1, wherein the interface is further configured to receive a datagram including channel state information in the predetermined order from at least one base station of the at least two base stations which serve the jointly processed data streams.

10. The apparatus of claim 9, wherein the interface is further configured to receive the datagram including an identifier identifying a signal transmission on at least one of the jointly processed data streams and/or a timestamp indicating a life time of the channel state information included in the datagram.

11. The apparatus of claim 1, wherein the interface is further configured to communicate information between the apparatus and at least one base station of the at least two base stations which serve the jointly processed data streams, and the processor is configured to switch off at least one of the jointly processed data streams between the apparatus and at least one user equipment served by the jointly processed data streams based on the information.

12. The apparatus according to claim 1, wherein the interface is further configured to communicate the datagram using user datagram protocol and internet protocol.

13. A user equipment comprising:
at least a one processor and at least one memory including computer program code, wherein the at least one memory and the computer code are configured to, with the at least one processor, cause the apparatus to at least perform the following:
obtain channel state information for jointly processed data streams of a coordinated multipoint transmission for base stations serving the user equipment according to a coordinated multi-point transmission, and arrange the channel state information in a predetermined order;
determine a life time of the channel state information, and prompt a time stamp indicating the life time of the channel state information; and
a transceiver configured to transmit the channel state information in the predetermined order;
wherein said coordinated multi-point transmission of jointly processed data streams comprises joint precoding of data and simultaneous transmission of the precoded data from at least two base stations.

14. A method comprising:
obtaining channel state information for jointly processed data streams of a coordinated multi-point transmission, the channel state information being in a predetermined order;
arranging the channel state information in the predetermined order into a datagram;
determining a life time of the channel state information, and arranging a time stamp indicating the life time of the channel state information into the datagram; and
transmitting the datagram to at least one base station of at least two base stations which serve the jointly processed data streams of a coordinated multi-point transmission;
wherein said coordinated multi-point transmission of jointly processed data streams comprises joint precoding of data and simultaneous transmission of the precoded data from the at least two base stations.

15. The method of claim 14, comprising:
arranging an identifier identifying a signal transmission on at least one of the jointly processed data streams into the datagram.

16. The method of claim 15, comprising: determining signal transmission on at least one of the jointly processed data streams based on the channel state information included in the datagram.

17. The method of claim 16, comprising:
deciding whether to use the channel state information included in the datagram for the signal transmission, based on the time stamp included in the datagram.

18. The method of claim 17, wherein old channel state information used in a previous signal transmission are used for the signal transmission, in case the time stamp indicates that the life time of the channel state information has expired.

19. The method of claim 16, comprising:
receiving/transmitting precoder weights from/to at least one base station of the at least two base stations which serve the jointly processed data streams, wherein the precoder weights are used for the signal transmission in case there is no channel state information available for said signal transmission.

20. The method of claim 16, wherein in a first operation mode the signal transmission is determined based on the channel state information, and in a second operation mode static precoding is used for the signal transmission.

21. The method of claim 14, comprising:
receiving the channel state information in the predetermined order from at least one user equipment of user equipments served by the jointly processed data streams.

22. The method of claim 14, comprising:
receiving a datagram including channel state information in the predetermined order from at least one base station of the at least two base stations which serve the jointly processed data streams.

23. The method of claim 22, comprising:
receiving the datagram including an identifier identifying a signal transmission on at least one of the jointly processed data streams and/or a timestamp indicating a life time of the channel state information included in the datagram.

24. The method of claim 14, comprising:
receiving/transmitting information from/to at least one base station of the plurality of at least two base stations which serve the jointly processed data streams; and
switching off at least one of the jointly processed data streams to at least one user equipment served by the jointly processed data streams based on the information.

25. The method according to claim 14, wherein the datagram is transmitted/received using user datagram protocol and internet protocol.

26. A method comprising:
obtaining channel state information for jointly processed data streams of a coordinated multi-point transmission for base stations serving a user equipment according to a coordinated multipoint transmission;
arranging the channel state information in a predetermined order;
determining a life time of the channel state information, and prompting a time stamp indicating the life time of the channel state information; and
transmitting the channel state information in the predetermined order;
wherein said coordinated multi-point transmission of jointly processed data streams comprises joint precoding of data and simultaneous transmission of the precoded data from at least two base stations.

27. A computer program product, embodied on a non-transitory computer-readable medium including a program for a processing device, comprising software code portions when the program is run on the processing device to perform or control:
obtaining channel state information for jointly processed data streams of a coordinated multi-point transmission, the channel state information being in a predetermined order;
arranging the channel state information in the predetermined order into a datagram;
determining a life time of the channel state information, and arranging a time stamp indicating the life time of the channel state information into the datagram; and
transmitting the datagram to at least one base station of at least two base stations which serve the jointly processed data streams of a coordinated multi-point transmission;
wherein said coordinated multi-point transmission of jointly processed data streams comprises joint precoding of data and simultaneous transmission of the precoded data from the at least two base stations.

* * * * *

UNITED STATES PATENT AND TRADEMARK OFFICE
CERTIFICATE OF CORRECTION

| | | |
|---|---|---|
| PATENT NO. | : 9,094,180 B2 | Page 1 of 1 |
| APPLICATION NO. | : 13/391769 | |
| DATED | : July 28, 2015 | |
| INVENTOR(S) | : Wolfgang Zirwas et al. | |

It is certified that error appears in the above-identified patent and that said Letters Patent is hereby corrected as shown below:

In the claims
In Claim 24:
Column 12, line 20, "plurality of" should be deleted.

Signed and Sealed this
Fifteenth Day of March, 2016

Michelle K. Lee
*Director of the United States Patent and Trademark Office*